United States Patent
Komukai et al.

(10) Patent No.: US 10,329,392 B2
(45) Date of Patent: Jun. 25, 2019

(54) CARBON FIBER-REINFORCED MOLDED ARTICLE

(71) Applicant: NITTA CORPORATION, Osaka-shi, Osaka (JP)

(72) Inventors: Takuji Komukai, Osaka (JP); Hiromi Teruhira, Osaka (JP); Katsuyuki Nakai, Osaka (JP)

(73) Assignee: NITTA CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/561,906

(22) PCT Filed: Mar. 30, 2016

(86) PCT No.: PCT/JP2016/060463
§ 371 (c)(1),
(2) Date: Sep. 26, 2017

(87) PCT Pub. No.: WO2016/159121
PCT Pub. Date: Oct. 6, 2016

(65) Prior Publication Data
US 2018/0112047 A1  Apr. 26, 2018

(30) Foreign Application Priority Data
Mar. 31, 2015 (JP) ................................ 2015-072259

(51) Int. Cl.
| | | |
|---|---|---|
| *C08J 5/04* | (2006.01) | |
| *C08J 5/06* | (2006.01) | |
| *C08K 3/04* | (2006.01) | |
| *C08K 3/013* | (2018.01) | |

(52) U.S. Cl.
CPC ................ *C08J 5/042* (2013.01); *C08J 5/06* (2013.01); *C08K 3/013* (2018.01); *C08K 3/041* (2017.05); *C08K 3/046* (2017.05); *C01B 2202/00* (2013.01); *C08J 2300/22* (2013.01); *C08J 2300/24* (2013.01); *C08J 2323/12* (2013.01); *C08J 2363/00* (2013.01)

(58) Field of Classification Search
CPC .. C08J 5/042; C08J 5/06; C08K 3/013; C08K 3/041; C08K 3/046
See application file for complete search history.

(56) References Cited

U.S. PATENT DOCUMENTS

| | | | |
|---|---|---|---|
| 2006/0004126 A1* | 1/2006 | Park | ........................... C08J 3/24 523/212 |
| 2016/0083899 A1* | 3/2016 | Onizuka | ................... C08J 5/042 428/336 |

FOREIGN PATENT DOCUMENTS

| | | |
|---|---|---|
| JP | 2003-238698 A | 8/2003 |
| JP | 2003-239171 A | 8/2003 |
| JP | 2007-126311 A | 5/2007 |
| JP | 2009-173529 A | 8/2009 |
| JP | 2009-535530 A | 10/2009 |
| JP | 2011-528056 A | 11/2011 |
| JP | 2013-076198 A | 4/2013 |
| WO | 2014/175319 A1 | 10/2014 |

OTHER PUBLICATIONS

Li, M., et al.; Carbon, 2013, vol. 52, p. 109-121.*

* cited by examiner

*Primary Examiner* — Robert S Jones
(74) *Attorney, Agent, or Firm* — Muncy, Geissler, Olds & Lowe, P.C.

(57) ABSTRACT

There is provided a carbon fiber-reinforced molded article that avoids peeling of carbon fibers from a base material and has high strength, the carbon fiber-reinforced molded article comprising a base material and a composite material dispersed in the base material, wherein the composite material comprises carbon fibers and a structure formed on the surface of the carbon fibers and including a plurality of carbon nanotubes, the plurality of carbon nanotubes forms a network structure in which the carbon nanotubes are directly connected to one another, and the plurality of carbon nanotubes is directly attached to the surface of the carbon fibers by using a portion of the surface thereof as an attaching portion, and also is physically bound to the surface of the carbon fibers via a binding member provided on at least a portion other than the attaching portion.

11 Claims, 5 Drawing Sheets

STRESS

CARBON FIBER-REINFORCED MOLDED ARTICLE

TECHNICAL FIELD

The present invention relates to carbon fiber-reinforced molded articles.

BACKGROUND ART

Composite materials comprising fibers formed of a carbon material and the like and a structure formed on the fiber surface have been proposed (for example, Patent Literature 1). In Patent Literature 1, the structure includes a plurality of carbon nanotubes, and the plurality of carbon nanotubes forms a network structure in which the carbon nanotubes are directly connected to one another and are also directly attached to the fiber surface. It is mentioned that a molded article containing such a composite material is capable of performing functions inherent in fibers as well as capable of exerting CNT-derived properties such as electrical conductivity, thermal conductivity, and mechanical strength.

Molded articles employing carbon fibers as a composite material (hereinbelow, these are referred to as carbon fiber-reinforced molded articles) have increased applications thereof in various fields such as aircrafts, automobiles, general industries, and sporting goods. In these carbon fiber-reinforced molded articles, requirements on the properties such as strength have been further stricter.

CITATION LIST

Patent Literature

Patent Literature 1 International Publication No. 2014/175319

SUMMARY OF INVENTION

Technical Problem

When an adhesive force between carbon fibers and a base material is small in a carbon fiber-reinforced molded article, the carbon fibers may be peeled off from the base material. Interfacial peeling, which causes reduction in the mechanical strength of the molded article, is desirably avoided as much as possible.

Thus, it is an object of the present invention to provide a carbon fiber-reinforced molded article that avoids peeling of carbon fibers from a base material and has high strength.

Solution to Problem

The carbon fiber-reinforced molded article according to the present invention is a carbon fiber-reinforced molded article comprising a base material and a composite material dispersed in the base material, wherein the composite material comprises a carbon fiber and a structure formed on a surface of the carbon fiber and including a plurality of carbon nanotubes, the plurality of carbon nanotubes form a network structure in which the carbon nanotubes are directly connected to one another, and the plurality of carbon nanotubes are directly attached to the surface of the carbon fiber by using a portion of the surface thereof as an attaching portion, and also are physically bound to the surface of the carbon fiber via a binding member provided on at least a portion other than the attaching portion.

Advantageous Effects of Invention

According to the present invention, the carbon fiber-reinforced molded article comprises a composite material dispersed in a base material. In the composite material, a structure containing a plurality of CNTs is formed on the surface of carbon fibers. The plurality of CNTs are directly attached to the surface of the carbon fibers by using a portion of the surface thereof as an attaching portion. Additionally, on at least a portion other than the attaching portion, a binding member exists between the CNTs and the carbon fibers. By this binding member, the CNTs can be physically bound to the carbon fiber surface. The CNTs are strongly bonded to the carbon fiber surface to enhance the adhesive force between the CNTs and the carbon fibers.

The CNTs strongly bonded to the carbon fiber surface intervene between the base material and the carbon fibers, and thus, the adhesive force between the base material and the carbon fibers is also enhanced. As a result, a carbon fiber-reinforced molded article that avoids peeling of carbon fibers from a base material and has high strength can be obtained.

BRIEF DESCRIPTION OF DRAWINGS

FIG. 6 is a SEM micrograph of a carbon fiber surface after carbon fibers removed from a sample composite material is subjected to interfacial shear strength measurement.

DESCRIPTION OF EMBODIMENTS

Hereinbelow, embodiments of the present invention will be described in detail with reference to the drawings.

1. First Embodiment

[Entire Configuration]

Figure 1:
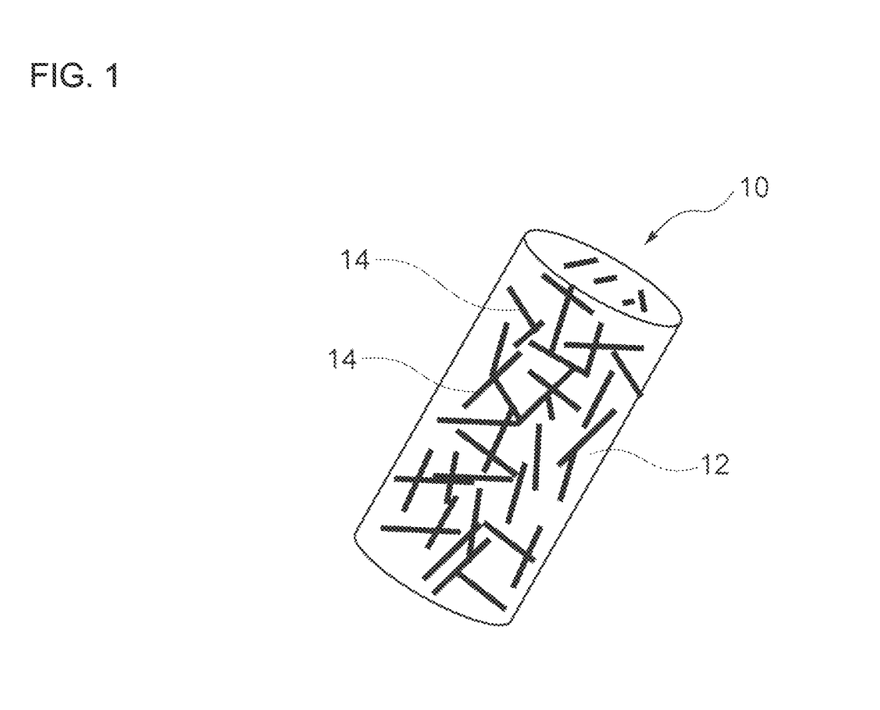
FIG. 1 is a schematic view showing the configuration of a carbon fiber-reinforced molded article according to First Embodiment.

As shown in FIG. 1, a carbon fiber-reinforced molded article 10 comprises a base material 12 and a plurality of composite materials 14 dispersed in the base material 12.

In the case of the present embodiment, the base material 12 is formed of a cured product of a resin material having a high viscosity. The resin material to be used has a melt flow rate (MFR), which is measured at the temperature and under the load of the standard conditions determined on type of material by a melt flow indexer described in JIS K7210, of about 1 to 100 g/10 min, and examples thereof include thermoplastic resins. Of thermoplastic resins, non-polar resins are particularly exemplified, and polypropylene can be used, for example. Polypropylene has a MFR at 230° C. under 2.16 kg, as measured by a melt flow indexer, of about 10 to 70 g/10 min.

Figure 2:
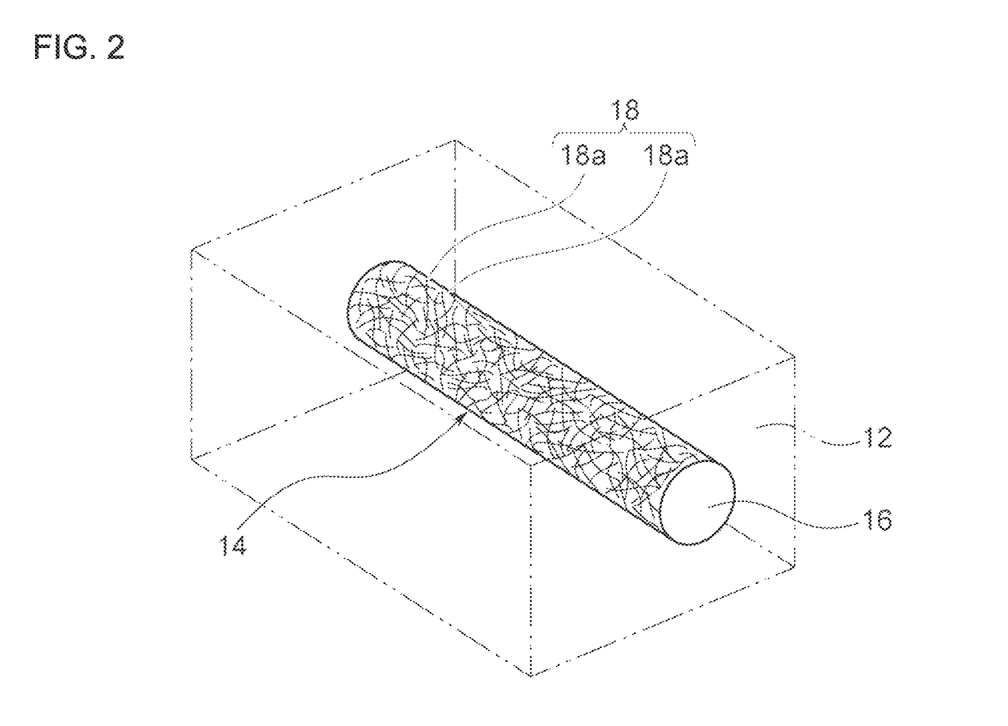
FIG. 2 is a schematic view showing the configuration of the surface of carbon fibers included in a composite material.

The composite material 14 has a structure 18 formed on the surface of carbon fibers 16, as shown in FIG. 2. In FIG. 2, only a carbon fiber 16 is shown for the sake of description, but in the present embodiment, a plurality of carbon fibers 16 having the structure 18 formed on the surface forms a bundle, and a plurality of carbon fibers 16 in the form of such a carbon fiber bundle constitutes the composite material 14. The carbon fiber bundle will be described later.

As the carbon fibers 16, for example, fibers contained in a fiber bundle that is obtained by removing a resin composition from a commercially available carbon fiber tow can be used. A carbon fiber tow is obtained by bundling thousands to tens of thousands of carbon fibers and attaching a trace amount of resin (sizing agent) thereon for bundling.

The structure 18 on the surface of the carbon fibers 16 includes a plurality of carbon nanotubes (hereinbelow, the carbon nanotubes are referred to as CNTs) 18a. The CNTs 18a are homogeneously dispersed across substantially the entire surface of the carbon fibers 16 and entangled to come in direct contact with or directly connect to one another without an intervening material, thereby forming a network structure. At the same time, the CNTs 18a are directly attached to the surface of the carbon fibers 16 in a state that no intervening material exists on the boundary with the surface. Connection herein encompasses physical connection (mere contact). Attachment herein refers to bonding due to a van der Waals force. Furthermore, the phrase "come in direct contact with or directly connect" encompasses a state in which a plurality of CNTs are integrally connected without an intervening material in addition to a state in which a plurality of CNTs are merely in contact with one another, and should not be interpreted limitedly.

The length of the CNTs 18a forming the structure 18 is preferably 0.1 to 50 μm. When the length of the CNTs 18a is 0.1 μm or more, the CNTs 18a are entangled with one another to be directly connected. When the length of the CNTs 18a is 50 μm or less, the CNTs 18a become likely to be dispersed homogeneously. In contrast, when the length of the CNTs 18a is less than 0.1 μm, the CNTs 18a become difficult to entangle with one another. When the length of the CNTs 18a exceeds 50 μm, the CNTs 18a become likely to aggregate.

The CNTs 18a preferably have an average diameter of about 30 nm or less. When the diameter of the CNTs 18a is 30 nm or less, the CNTs 18a are highly flexible, and a network structure can be formed on the surface of each of the carbon fibers 16. In contrast, when the diameter of the CNTs 18a is more than 30 nm, the flexibility becomes lacking, and a network structure becomes difficult to form on the surface of each of the carbon fibers 16. The diameter of the CNTs 18a is an average diameter measured by using a transmission electron microscope (TEM) micrograph. The CNTs 18a preferably have an average diameter of about 20 nm or less.

Figure 3:
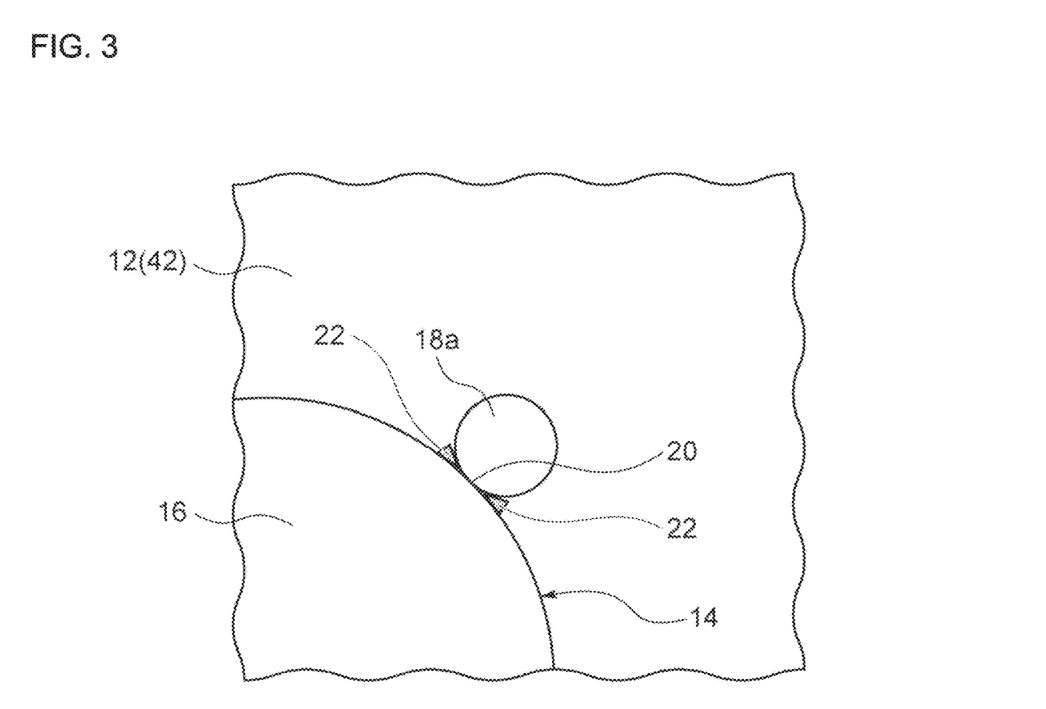
FIG. 3 is an enlarged schematic view illustrating a state of CNTs on a carbon fiber surface.

A plurality of CNTs 18a are preferably attached homogeneously to the surface of the carbon fibers 16. Attachment herein refers to bonding due to a van der Waals force. The CNTs 18a are directly attached to the surface of the carbon fibers 16 by using a portion of the surface thereof as an attaching portion 20, as shown in FIG. 3.

In the present embodiment, a binding member 22 is further provided in adjacent to the attaching portion 20, as shown in the figure. The binding member 22 is formed of a cured product of a thermosetting resin, and for example, a cured product of an epoxy resin is used. The binding member 22 physically binds the CNTs 18a to the carbon fibers 16 via wet adhesion. On the periphery of the attaching portion 20, at least a portion other than the attaching portion is reinforced with the binding member 22 to thereby enhance the adhesive force between the CNTs 18a and the carbon fibers 16.

[Production Method]

Subsequently, a method for producing a carbon fiber-reinforced molded article 10 will be described. With regard to producing the carbon fiber-reinforced molded article 10, first, a dispersion containing CNTs 18a is used to form a structure 18 on the surface of the carbon fibers 16, and a binding member 22 is provided between the carbon fibers 16 and the CNTs 18a to obtain a composite material 14. Then, after the raw material of a base material 12 and the composite material 14 are mixed and kneaded, the resultant mixture is cured, and thus the carbon fiber-reinforced molded article 10 can be produced. Hereinbelow, each step will be described in order.

<Preparation of Dispersion>

For preparation of the dispersion, the CNTs 18a produced as follows can be used. The CNTs 18a can be formed by depositing a catalytic film constituted by aluminum or iron onto a silicon substrate by using the thermal CVD method as described in, for example, Japanese Patent Laid-Open No. 2007-126311, microparticulating the catalytic metals for CNT growth, and bringing a hydrocarbon gas into contact with the catalytic metals in a heating atmosphere. CNTs obtained by other production method such as the arc discharge method and the laser evaporation method also can be used, but CNTs containing impurities as little as possible are preferably used. These impurities may be removed by high temperature annealing in an inert gas after CNTs are produced. The CNTs produced in this production example are linearly-oriented long CNTs having a diameter of 30 nm or less and a length of several hundred micrometers to several millimeters, thus having a high aspect ratio. The CNTs may be single-walled or multi-walled CNTs, and preferably multi-walled CNTs.

Subsequently, the CNTs 18a produced above are used to prepare a dispersion in which the CNTs 18a are isolatedly dispersed. The phrase "isolatedly dispersed" refers to a state in which the CNTs 18a are dispersed in a dispersion medium with each physically separated and not entangled with one another and means a state in which the ratio of aggregates of two or more of the CNTs 18a aggregated in a bundle form is 10% or less.

The dispersion is prepared by adding to the CNTs 18a produced as above in a dispersion medium, and a homogenizer, a shear disperser, an ultrasonic disperser or the like is used to achieve homogeneous dispersion of the CNTs 18a. Examples of the dispersion medium that can be used include water, alcohols such as ethanol, methanol, and isopropyl alcohol, and organic solvents such as toluene, acetone, tetrahydrofuran, methyl ethyl ketone, hexane, normal hexane, ethyl ether, xylene, methyl acetate, and ethyl acetate. Additives such as a dispersing agent and a surfactant are not necessarily required for preparing the dispersion, but such additives may be used as long as the functions of carbon fibers 16 and CNTs 18a are not limited.

<Formation of Structure>

The carbon fibers 16 can be prepared by immersing a commercially available carbon fiber tow in a resin remover to remove the resin composition. The carbon fiber tow is not particularly limited, and an example thereof is model: TORAYCA T700SC-12000 manufactured by Toray Industries, Inc. As the resin remover, for example, organic solvents such as methyl ethyl ketone can be used. In order to effectively remove the resin composition, mechanical energy such as ultrasonics is preferably imparted to the resin remover in which the carbon fiber tows are immersed. Removal of the resin composition from the carbon fiber tow can provide a fiber bundle including a plurality of carbon fibers 16.

In a state that the fiber bundle including the carbon fibers 16 thus prepared is immersed in the above dispersion, mechanical energy such as shear and ultrasonics is imparted to the dispersion. The CNTs 18a attach to the surface of each of the carbon fibers 16 by a van der Waals force acting between CNTs 18a and the surface of the carbon fibers 16. Thereafter, when the fiber bundle including the plurality of carbon fibers 16 is withdrawn from the dispersion and dried, the CNTs 18a attach directly to the surface of the carbon fibers 16 at the attaching portion 20.

In this manner, a structure 18 having a network structure in which the CNTs 18a are directly connected to one another is formed on the surface of each of the carbon fibers 16 in the fiber bundle. The structure 18 having a predetermined thickness can be formed on the surface of the carbon fibers 16 by repeating the steps of immersion and drying.

<Formation of Binding Member>

An epoxy resin as the raw material of the binding member 22 is dissolved in a solvent to prepare a solution. Examples of the solvent that can be used include toluene, xylene, methyl ethyl ketone (MEK), methyl isobutyl ketone (MIBK), butanol, ethyl acetate, and butyl acetate.

A fiber bundle including the carbon fibers 16 having a structure 18 formed on their surface is immersed in the solution of the epoxy resin. Then, the fiber bundle is heated in an oven to cure the epoxy resin. Heating can be carried out for example, at 80 to 150° C. for about 0.5 to 5 hours. Thereby, the binding member 22 constituted by a cured product of the epoxy resin is formed on at least a portion other than the attaching portion 20 of the CNTs 18a, and the CNTs 18a are physically bound to the carbon fibers 16 to thereby obtain a composite material 14.

The composite material 14 thus produced is cut into a dimension suitable for kneading with resin chips. The composite material 14 can be cut into a length of about 1 to 20 mm by using a fiber cutter and the like.

<Production of Molded Article>

The composite material 14 produced as described above is mixed and kneaded with thermoplastic resin chips as the raw material of the base material 12. As the thermoplastic resin, polypropylene can be used.

For example, a mixture containing the cut composite material 14 and polypropylene chips are linearly extruded while melt and kneaded. Kneading is carried out generally at 190 to 230° C., and thus, the resin melt (the resin material of the base material) at this time has a viscosity of about 10 to 70 g/10 min. After cooling, the extrudate is cut into a desired length to obtain the carbon fiber-reinforced molded article 10 of the present embodiment.

[Action and Effects]

The carbon fiber-reinforced molded article 10 configured as described above is reinforced with the composite material 14 that includes the carbon fibers 16 having the structure 18 including CNTs 18a on its surface. The composite material 14 has fine asperities ascribed to the structure 18 on its surface, and thus, the adhesive force between the carbon fibers 16 and the base material 12 is reinforced by an anchoring effect.

Figure 4:
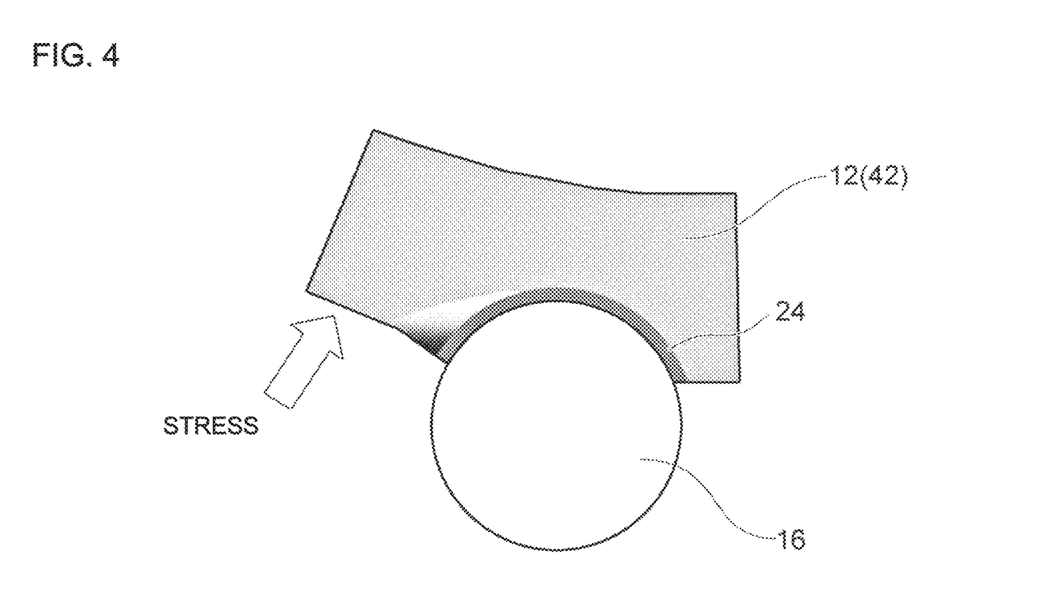
FIG. 4 is a schematic diagram describing stress relaxation.

The carbon fibers 16 in the composite material 14 has a high modulus of elasticity, whereas the base material 12 constituted by a cured product of a resin material has a low modulus of elasticity. In the carbon fiber-reinforced molded article 10, a CNT composite resin layer 24 is formed by a portion of the base material 12 and the CNTs 18a on the interface between the carbon fibers 16 and the base material 12, as shown in FIG. 4. Since the CNT composite resin layer 24 intervening between the carbon fibers 16 and the base material 12 reduces an abrupt change in the modulus of elasticity, the stress concentration at the interface between the carbon fibers 16 and the base material 12 is relaxed.

Furthermore, in the composite material 14 included in the carbon fiber-reinforced molded article 10 of the present embodiment, the CNTs 18a are not only directly attached to the surface of the carbon fibers 16 but also physically bound to the surface of the carbon fibers 16 by the binding member 22. Existence of the binding member 22 enhances the adhesive force between the CNTs 18a and the carbon fibers 16. Thus, even when the composite material 14 is subjected to a shear force, the possibility of peeling of the CNTs 18a from the carbon fibers 16 is extremely low. Accordingly, on producing the carbon fiber-reinforced molded article 10 of the present embodiment, the CNTs 18a are maintained on the surface of the carbon fibers 16 even when kneading is carried out by using a highly-viscous resin material as the raw material of the base material 12.

In the carbon fiber-reinforced molded article 10, the CNTs 18a reliably intervene between the carbon fibers 16 and the base material 12. These CNTs 18a have enabled to enhance the adhesive force between the carbon fibers 16 and the base material 12.

In this manner, in the present embodiment, the CNTs 18a intervene between the carbon fibers 16 and the base material 12, and thus adhesiveness between the carbon fibers 16 and the base material 12 is enhanced. In order to enhance the adhesiveness with the carbon fibers 16, it is not necessary to modify the base material 12 itself.

EXAMPLES

In the following examples, a carbon fiber tow including a plurality of carbon fibers was used to produce a composite material. By using carbon fibers removed from the composite material as specimens, the interfacial shear strength between the carbon fibers and a resin was measured by the microdroplet method.

(Samples)

CNTs used for attaching to the surface of the carbon fibers were Multi-Walled Carbon Nanotubes (MW-CNTs) which were grown to have a diameter of 10 to 15 nm and a length of 100 μm or more on a silicon substrate by the thermal CVD method. For removal of catalyst residues from the CNTs, a 3:1 mixed acid of sulfuric acid and nitric acid was used, and after washing, the CNTs were filtered and dried. Methyl ethyl ketone was used as the CNT dispersion medium to prepare a dispersion. The concentration of CNTs in the dispersion was set to 0.01 wt %.

As the carbon fiber tow, a carbon fiber tow (model: TORAYCA T-700SC-12000 manufactured by Toray Industries, Inc.), which is formed by bundling 12,000 carbon fibers having a diameter of 7 μm, was used. First, the carbon fiber tow was immersed in a resin remover to remove the resin composition to obtain a fiber bundle including a plurality of carbon fibers. As the resin remover, MEK was used. In removing the resin composition, mechanical energy was imparted by ultrasonics to the resin remover in which the carbon fiber tow was immersed.

Then, the fiber bundle was immersed in a dispersion, to which mechanical energy was imparted by ultrasonics to attach the CNTs to the surface of each of the carbon fibers in the fiber bundle. Thereafter, the fiber bundle was removed from the dispersion and dried with a dryer to form a structure on the surface of each of the carbon fibers in the fiber bundle.

As the raw material for the binding member, a solution was prepared by dissolving an epoxy resin in MEK. The fiber bundle including the carbon fibers having a structure formed on their surface was immersed in the solution as described above. Then, the fiber bundle was heated in an oven at 130° C. for about an hour to cure the epoxy resin. In this manner, the binding member was formed on at least a portion other than the attaching portion of the CNTs to thereby obtain a composite material of Sample 1. In the composite material of Sample 1, the CNTs are directly attached and furthermore physically bound by the binding member, to the surface of the carbon fibers.

Additionally, composite materials of Samples 2 to 4 were obtained in the same manner as of Sample 1 except that the following points were changed.

Sample 2: No binding member to physically bind CNTs to the carbon fiber surface is provided.

Sample 3: No CNT is attached to the carbon fiber surface, and only a binding member is provided.

Sample 4: No CNT is attached to the carbon fiber surface, and no binding member is provided.

(Evaluation 1)

A carbon fiber was removed from each of the composite materials of Samples 1 to 4 and used as a specimen, of which interfacial shear strength was measured. For interfacial shear strength measurement, evaluation equipment for interfacial property of composite material (HM410 manufactured by Tohei Sangyo Co., Ltd.) was used. First, the specimen was coated with a liquid thermoplastic resin in an 80° C. atmosphere to produce a microdroplet and heated under conditions of 125° C. for one hour. As the thermoplastic resin, model: PM801A manufactured by SunAllomer Ltd. was used.

Figure 5:
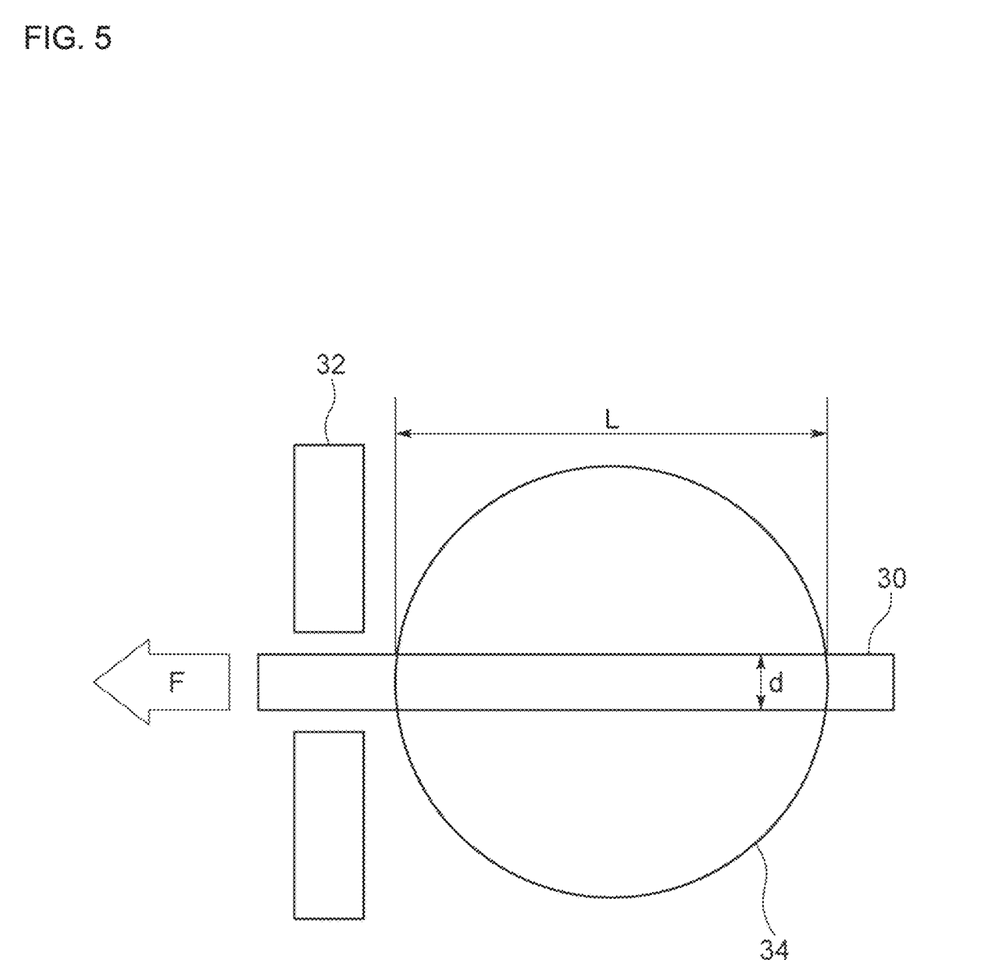
FIG. 5 is a schematic diagram showing a method for measuring interfacial shear strength.

After cooling to room temperature, the specimen 30 was sandwiched with blades 32, as shown in FIG. 5. Then, the specimen 30 was moved at a rate of 0.12 mm/min in the longitudinal direction of the specimen 30 (in an arrow direction in the drawing). While the specimen 30 was drawn out from the microdroplet 34, the maximum load F during drawing-out was measured with a load cell (not shown). Measurement was carried out five times each on the specimens at room temperature under an air atmosphere. The interfacial shear strength τ was calculated by the following expression (1) to evaluate the interfacial shear strength of Samples 1 to 4. The results are shown together with the surface state of the specimens in Table 1. In the following expression (1), F: the maximum load during drawing-out, d: fiber diameter, L: length of the microdroplet in the drawing-out direction.

$$\tau = F/(d\pi L) \quad (1)$$

TABLE 1

| Sample | CNT | Binding member | Interfacial shear strength (MPa) |
|---|---|---|---|
| 1 | Yes | Yes | 12.4 |
| 2 | Yes | No | 10.6 |
| 3 | No | Yes | 9.8 |
| 4 | No | No | 9.7 |

As shown in Table 1 above, Sample 1, having a binding member provided between the CNTs and the carbon fibers, has interfacial shear strength as high as 12.4 MPa. In the case of Sample 2, in which no binding member exists even if the CNTs are attached to the surface of the carbon fibers, the interfacial shear strength remains at 10.6 MPa. In the case in which no CNT is attached to the surface of the carbon fibers (Samples 3 and 4), the interfacial shear strength is not significantly influenced by the presence or absence of the binding member and is 9.7 to 9.8 MPa. An untreated carbon fiber tow from which no resin composition was removed (model: TORAYCA T-700SC-12000 manufactured by Toray Industries, Inc.) had interfacial shear strength of 8.0 MPa as determined in the same manner.

In the composite material of Sample 1, the CNTs are attached to the carbon fiber surface, and additionally, a binding member exists between the CNTs and the carbon fibers. It is assumed that the CNTs are physically bound to the carbon fiber surface via the binding member and thus the adhesive force between the CNTs and the carbon fibers is enhanced to thereby increase the interfacial shear strength.

Figure 6A:
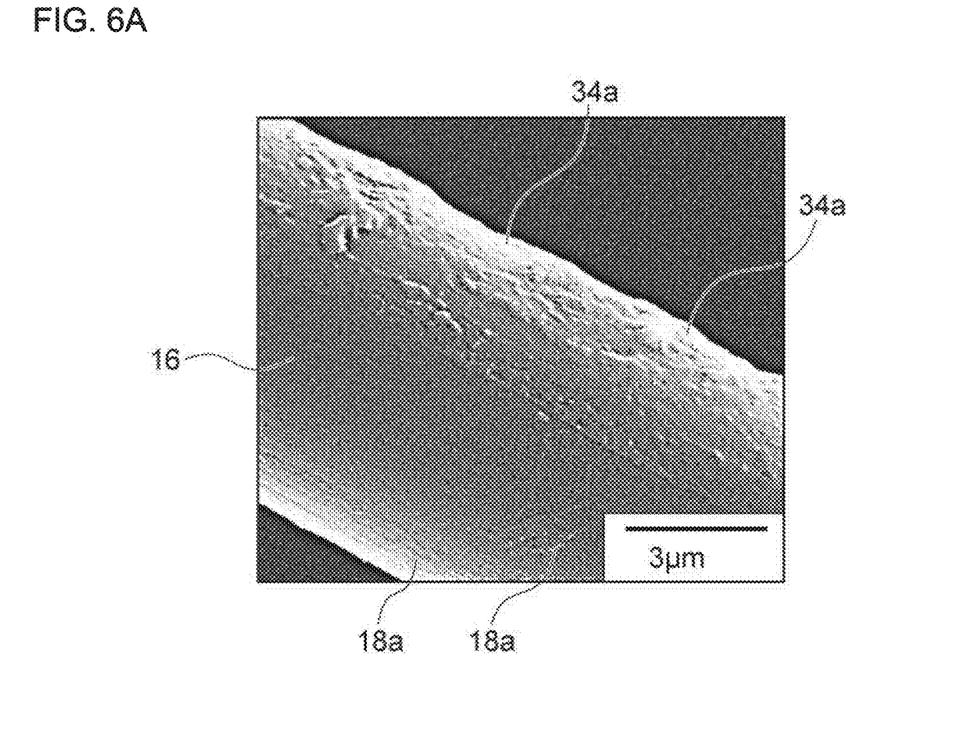
FIG. 6A is a SEM of Sample 1 and FIG. 6B is a SEM of Sample 2.
Figure 6B:
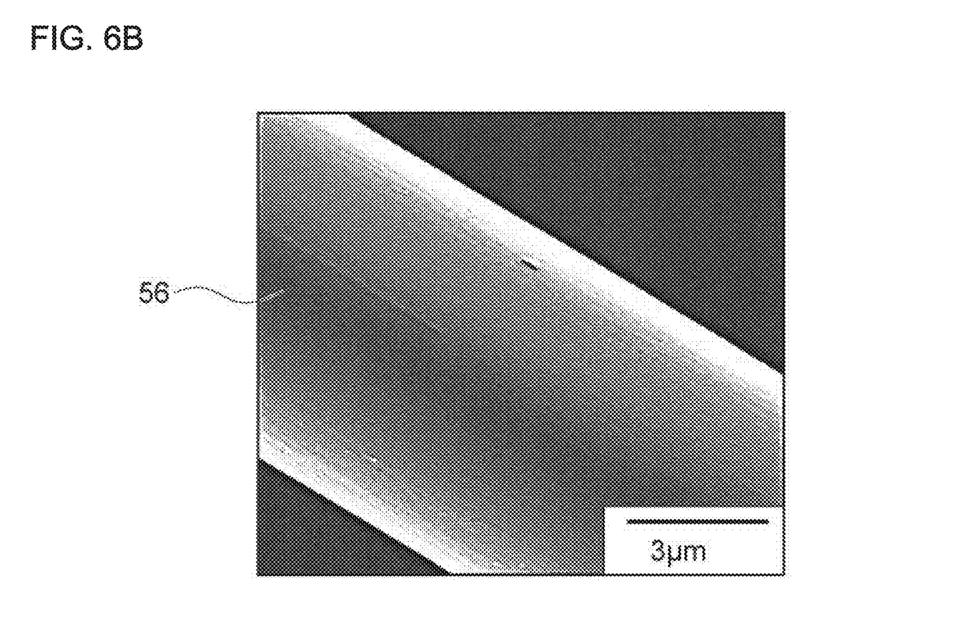

FIGS. 6A and 6B are SEM micrographs of the portion of the carbon fibers from which the microdroplet was peeled off in Samples 1 and 2 after the interfacial shear strength was measured. As shown in FIG. 6A, a thermoplastic resin 34a was observed together with the CNTs 18a on the surface of carbon fibers 16 removed from Sample 1. The thermoplastic resin 34a is a portion of the microdroplet 34 remaining.

Although not clearly shown in the SEM micrographs, the CNTs 18a are physically bound to the surface of the carbon fibers 16 by the binding member in Sample 1. The CNTs 18a are strongly bonded to the carbon fibers 16, and the possibility of peeling of the CNTs 18a from the surface of the carbon fibers 16 is low. The microdroplet 34 is bonded to the carbon fibers 16 via such CNTs 18a, and thus, the adhesive force between the microdroplet 34 and the carbon fibers 16 is also enhanced. It is assumed that high interfacial shear strength was consequently obtained.

In contrast, in the case of Sample 2 as shown in FIG. 6B, no thermoplastic resin is observed and no CNT is attached to the surface of carbon fibers 56. It can be seen that the microdroplet provided on the surface of the carbon fibers 56 was peeled off together with the CNTs from the surface of the carbon fibers 56. It can be seen that the interfacial shear strength is smaller than that of Sample 1 because the CNTs are not physically bound to the carbon fibers by the binding member.

The results of interfacial shear strength measurement obtained as above show that a composite material capable of strongly bonding to a microdroplet can be obtained by providing a binding member that physically binds CNTs to carbon fibers. It is assumed that a fiber reinforced molded article having improved interfacial shear strength between carbon fibers and a base material can be obtained by using such a composite material.

(Evaluation 2)

The composite materials of Sample 1 and Sample 3 were used to prepare unidirectional prepregs using a polypropylene resin as the base material (fiber volume content: 60%). The prepreg produced was layered in three layers by a thermal press (molding temperature: 190° C.) to obtain a sheet for evaluation (thickness: about 0.4 mm).

The sheet for evaluation was produced into angle-type test pieces shown in JIS K6252 by punching. The test pieces obtained were subjected to the tear test (test speed: 1 mm/min) by using an autograph (AGS-5kNX manufactured by SHIMADZU CORPORATION). The results are summarized together with the surface state of the composite materials in Table 2 below.

TABLE 2

| Sample | CNT | Binding member | Tear strength (kN/m) |
|---|---|---|---|
| 1 | Yes | Yes | 72 |
| 3 | No | Yes | 24 |

As shown in Table 2 above, Sample 1 has higher tear strength than Sample 3 due to existence of the carbon nanotube network structure on the surface of the carbon fibers. It is believed that this is ascribed to the enhancement in the interfacial adhesiveness between the carbon fibers and the base material caused by carbon nanotubes present on the carbon fiber surface.

2. Second Embodiment

[Entire Configuration]

Subsequently, the entire configuration of a carbon fiber-reinforced molded article 40 according to Second Embodiment of the present invention will be described with reference to FIG. 7, in which constituents similar to those of the carbon fiber-reinforced molded article 10 according to the First Embodiment are designated by the same reference numerals.

Figure 7:
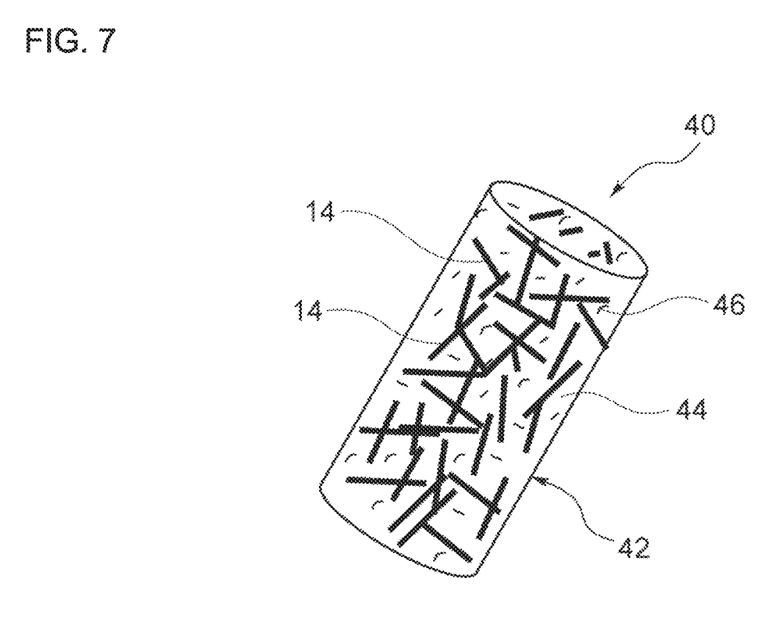
FIG. 7 is a schematic view showing the configuration of a carbon fiber-reinforced molded article according to Second Embodiment.

The carbon fiber-reinforced molded article 40 shown in FIG. 7 comprises a base material 42 and a plurality of composite materials 14 dispersed in the base material 42. In the case of the present embodiment, the base material 42 is formed by a cured product of a resin 44 containing a filler 46, and the constituents are similar to those of the carbon fiber-reinforced molded article 10 of First Embodiment except this point is different.

Also in the present embodiment, the base material 42 is formed by a cured product of a resin composition having a MFR at 230° C. of about 10 to 70 g/10 min measured by a melt flow indexer. In the base material 42, CNTs as the filler 46 are dispersed in polypropylene as a resin 44. As the CNTs, CNTs similar to those that form the structure 18 on the surface of the carbon fibers 16 as described in First Embodiment can be used.

The CNTs as the filler 46 are contained in the resin 44 in a concentration of about 1 to 20 vol. %.

As described with reference to FIG. 3, the CNTs 18a are directly attached to the surface of the carbon fibers 16 by using a portion of the surface thereof as an attaching portion 20. The CNTs 18a are physically bound to the carbon fibers 16 via a binding member 22 provided on at least a portion other than the attaching portion 20, and thus, the adhesive force between the CNTs 18a and the carbon fibers 16 is enhanced.

[Production Method]

Subsequently, a method for producing a carbon fiber-reinforced molded article 40 will be described. The carbon fiber-reinforced molded article 40 can be produced in the same manner as in the case of First Embodiment except that a resin 44 containing a filler 46 is used as the raw material of the base material 42.

CNTs as the filler 46 and the resin 44 are mixed to prepare a resin composition having a MFR at 230° C. of about 10 to 70 g/10 min measured by a melt flow indexer. With regard to mixing, an approach appropriate for the resin 44 and the filler 46 can be employed.

The carbon fiber-reinforced molded article 40 of Second Embodiment can be obtained by mixing and molding the composite material 14 obtained in the same manner as in the case of First Embodiment and the resin composition. Mixing and molding can be carried out by applying an approach appropriate for the resin composition.

[Action and Effects]

In the carbon fiber-reinforced molded article 40 of Second Embodiment, the base material 42 is constituted by a cured product of the resin 44 in which the filler 46 is dispersed. Because the molded article of Second Embodiment is the same as the carbon fiber-reinforced molded article 10 of First Embodiment except this point, the same effect as in the case of First Embodiment can be achieved in the carbon fiber-reinforced molded article of Second Embodiment.

Furthermore, since the base material 42 is constituted by the cured product of the resin 44 in which the filler 46 is dispersed, the carbon fiber-reinforced molded article 40 of Second Embodiment also has an advantage of having high compression strength.

3. Modified Example

The present invention is not limited to the embodiments described above and can be varied within the spirit of the present invention as appropriate.

For example, in First Embodiment, the case in which the base material 12 is formed with polypropylene as a thermoplastic resin is described, but thermoplastic resins such as polyamide (PA), polyphenylenesulfide (PPS), polyetherimide (PEI), polycarbonate (PC), polyethylene terephthalate (PET), polyetheretherketone (PEEK), polyetherketoneketone (PEKK), and polyethylene may be used. In Second Embodiment, as the resin 44 contained in the base material 42, for example, PA can be used. As the filler 46, for example, carbon nanotubes, carbon nanofibers, and carbon black can be used. A resin material prepared by arbitrarily combining the resin 44 and the filler 46 can be used to prepare the base material 42.

In either of the embodiments, when a resin material having a melt flow rate of about 1 to 100 g/10 min measured by a melt flow indexer, as measured at the temperature and under the load of the standard conditions determined on type of material by a melt flow indexer described in JIS K7210 is used, the effect of the present invention is sufficiently exerted.

The procedure for producing the composite material 14 by using fibers contained in a fiber bundle obtained by removing the resin composition from a commercially available carbon fiber tow as the carbon fibers 16 has been described, but the present invention is not limited to this. For example, with fibers not coated with a resin composition, the step of removing the resin composition can be omitted.

The case in which the composite material 14 comprises, for example, a fiber bundle including about thousands to tens of thousands of carbon fibers bundled has been described, but the present invention is not to limited to this, and one carbon fiber may form the composite material. In this case, as the carbon fiber 16, a fiber having a diameter of about 3 to 15 μm, obtained by baking organic fibers derived from petroleum, coal, or coal tar such as polyacrylonitrile, rayon, and pitch or organic fibers derived from wood or plant fibers, can be used.

The carbon fibers 16 are not limited to continuous fibers such as carbon fiber tows, and fibers having a length of about 1 to 20 mm may be used. In this case, a step of cutting the composite material 14 can be omitted before kneading with resin chips for production of a molded article.

With regard to forming the binding member 22, a solution of an epoxy resin, which is a material of the binding member 22 may be emulsified. For example, emulsification can be carried out by adding an emulsifier such as a nonionic emulsifier to a solution prepared by dissolving an epoxy resin in a solvent. In the case in which, besides cured products of an epoxy resin, a cured product of, for example, a phenol resin, a polyurethane resin, a melamine resin, a urea resin, or a polyimide resin is used as the binding member 22, the similar effect can be achieved. A silane coupling agent also can be used as the binding member. In the case in which the material of the binding member 22 is changed, the binding member 22 can be formed in the same manner as in the case of an epoxy resin.

When the binding member 22 is provided on at least a portion other than the attaching portion 20 of the CNTs 18a, the effect of enhancing the adhesive force between the carbon fibers 16 and the base materials 12 and 42 can be obtained. The binding member 22 may be provided on the remainder of the surface of the CNTs 18a.

In the composite material 14 comprising the CNTs 18a directly attached to the surface of the carbon fibers 16, carbon fiber-reinforced molded articles 10 and 40 that avoid peeling of carbon fibers 16 from base materials 12 and 42 and have high strength can be obtained as described above, provided that CNTs 18a are physically bound to the carbon fibers 16 by the binding member 22.

REFERENCE SIGNS LIST 10, 40 Carbon fiber-reinforced molded article
12, 42 Base material
14 Composite material
16 Carbon fibers
18 Structure
18a Carbon nanotube (CNT)
20 Attaching portion
22 Binding member
24 CNT composite resin layer
30 Specimen
32 Blade
34 Microdroplet
34a Thermoplastic resin
44 Resin
46 Filler

The invention claimed is:

1. A carbon fiber-reinforced molded article comprising a base material and a composite material dispersed in the base material,
    wherein the composite material comprises a carbon fiber and a structure formed on a surface of the carbon fiber and including a plurality of carbon nanotubes,
    the plurality of carbon nanotubes form a network structure in which the carbon nanotubes are directly connected to one another,
    the plurality of carbon nanotubes are directly attached to the surface of the carbon fiber in a state that no intervening material exists between the plurality of carbon nanotubes and the surface of the carbon fiber by using a portion of the surface thereof as an attaching portion, and also are physically bound to the surface of the carbon fiber via a binding member provided on at least a portion other than the attaching portion that is defined between the carbon nanotubes and the carbon fiber, and
    the plurality of carbon nanotubes intervene between the base material and the carbon fiber, wherein
    a material of the binding member differs from a material of the base material.

2. The carbon fiber-reinforced molded article according to claim 1, wherein
    the binding member is a cured product of a thermosetting resin.

3. The carbon fiber-reinforced molded article according to claim 2, wherein
    the thermosetting resin is selected from epoxy resins, phenol resins, polyurethane resins, melamine resins, urea resins, and polyimide resins.

4. The carbon fiber-reinforced molded article according to claim 3, wherein
    the thermosetting resin is an epoxy resin.

5. The carbon fiber-reinforced molded article according to claim 1, wherein
    the base material is a cured product of a thermoplastic resin.

6. The carbon fiber-reinforced molded article according to claim 5, wherein
    the thermoplastic resin is a non-polar resin.

7. The carbon fiber-reinforced molded article according to claim 6, wherein
    the non-polar resin is polypropylene.

8. The carbon fiber-reinforced molded article according to claim 1, wherein
    the base material is a cured product of a resin comprising 1 to 20 vol. % of a filler.

9. The carbon fiber-reinforced molded article according to claim 8, wherein
    the resin is a thermoplastic resin.

10. The carbon fiber-reinforced molded article according to claim 8, wherein
    the filler is selected from carbon nanotubes, carbon nanofibers, and carbon black.

11. The carbon fiber-reinforced molded article according to claim 2, wherein
    the base material is a cured product of a thermoplastic resin.

* * * * *